United States Patent [19]
Takei et al.

[11] Patent Number: 5,871,558
[45] Date of Patent: Feb. 16, 1999

[54] PROCESS FOR PRODUCING SILICA GLASS

[75] Inventors: Kouichi Takei; Youichi Machii; Toshikatsu Shimazaki; Hiroki Terasaki; Hidekuni Banno, all of Tsukuba; Yutaka Honda, Tsuchiura; Nobuaki Takane, Tsukuba, all of Japan

[73] Assignee: Hitachi Chemical Company, Ltd., Tokyo, Japan

[21] Appl. No.: 794,620

[22] Filed: Feb. 3, 1997

[30] Foreign Application Priority Data

Aug. 4, 1994 [WO] WIPO ................ PCT/JP94/01289

[51] Int. Cl.$^6$ ........................................ C03B 8/02
[52] U.S. Cl. ............................... 65/17.21; 501/12
[58] Field of Search ................. 501/12; 65/17.2

[56] References Cited

U.S. PATENT DOCUMENTS

| | | | |
|---|---|---|---|
| 5,196,382 | 3/1993 | Hench et al. | 501/12 |
| 5,236,483 | 8/1993 | Miyashita et al. | 501/12 |

FOREIGN PATENT DOCUMENTS

| | | |
|---|---|---|
| A-61-270225 | 11/1986 | Japan . |
| A-62-265128 | 11/1987 | Japan . |
| A-62-265130 | 11/1987 | Japan . |
| A-1-215728 | 8/1989 | Japan . |
| A-2-14835 | 1/1990 | Japan . |
| A-2-59446 | 2/1990 | Japan . |
| A-3-247515 | 11/1991 | Japan . |

*Primary Examiner*—Karl Group
*Attorney, Agent, or Firm*—Pennie & Edmonds LLP

[57] ABSTRACT

A silica glass production process that can prevent cracks from occurring during the step of gel drying. In a process for producing silica glass, comprising the steps of subjecting a partial polycondensation product of alkoxysilane to hydrolysis in the presence of a solvent, an organic polymeric compound and a basic catalyst to form a sol, making the sol into a gel, drying the gel to form a dry gel, and firing the dry gel to obtain a glass, a salt is caused to exist in a concentration not less than $1\times10^{-4}$ mol based on 100 g of the partial polycondensation product of alkoxysilane in the step of subjecting the partial polycondensation product of alkoxysilane to hydrolysis to form a sol.

7 Claims, No Drawings

PROCESS FOR PRODUCING SILICA GLASS

TECHNICAL FIELD

This invention relates to a process for producing silica glass used for optics, semiconductors, electronic industries, and the fields of physics and chemistry, and so forth.

BACKGROUND ART

Silica glass is an important material indispensable for the fabrication of semiconductor devices because of its superior heat resistance, corrosion resistance and optical characteristics, and is also used in optical fibers, photomask substrates for producing ICs, TFT substrates and so forth, showing increasingly wide uses.

The sol-gel method, which enables synthesis of high-purity silica glass at a low cost, has attracted notice. This method will be simply outlined below.

To an alkoxysilane represented by the general formula Si(OR)4 (R: an alkyl group), water (its pH may be adjusted with a base or an acid) is added to carry out hydrolysis to form a silica hydrosol (in the present invention, called a "sol"). Here, a suitable solvent is commonly added so that the alkoxysilane and the water are homogeneously mixed. This sol is gelled by leaving it to stand or raising its temperature. Thereafter, the liquid phase (an alcohol formed as a result of the hydrolysis of alkoxysilane, the solvent added, or the water) in the gel is evaporated, followed by drying to form a silica dry gel (in the present invention, called a "dry gel"). This dry gel is fired in an appropriate atmosphere to obtain silica glass.

As a problem in the process for producing silica glass by the sol-gel method described above, the gel may crack during the step of drying. As a method for preventing it from cracking, various methods are proposed in which, e.g., a partial polycondensation product of alkoxysilane is used as a material for the alkoxysilane (Japanese Patent Application Laid-open No. 61-270225), choline is used as a catalyst for the hydrolysis of alkoxysilane (Japanese Patent Application Laid-open No. 62-265128), an organic polymeric compound is added when the sol is prepared (Japanese Patent Application Laid-open No. 62-265130, the polycondensation product of a partial polycondensation product of alkoxysilane is made compositionally optimum (Japanese Patent Application Laid-open No. 3-247515), and a solvent having a higher boiling point and a smaller surface tension than water is used as a solvent (Japanese Patent Application Laid-open No. 2-14835).

However, even when these proposed methods are used, the gel may often crack during the step of drying when the dry gel is large in size, and the yield abruptly decreases with an increase in size of the dry gel.

DISCLOSURE OF THE INVENTION

An object of the present invention is to provide a process for producing silica glass that can prevent the dry gel from cracking.

The present invention is a process for producing silica glass, comprising the steps of subjecting a partial polycondensation product of alkoxysilane to hydrolysis in the presence of a solvent, an organic polymeric compound and a basic catalyst to form a sol, gelling the sol, drying the gel to form a dry gel, and firing the dry gel to form a glass; wherein, in the step of subjecting the partial polycondensation product of alkoxysilane to hydrolysis to form a sol, a salt is caused to exist in a concentration not less than $1\times10^{-4}$ mol based on 100 g of the partial polycondensation product of alkoxysilane.

The present inventors took note of the concentration of a salt formed in the sol in the course of such preparation of the sol, and pushed studies forward. As a result, they have confirmed that in a process for producing silica glass, comprising the steps of subjecting a partial polycondensation product of alkoxysilane to hydrolysis in the presence of a solvent, an organic polymeric compound and a basic catalyst to form a sol, gelling the sol, drying the gel to form a dry gel, and firing the dry gel to form a glass, the gel can be well prevented from cracking during the step of drying when, in the step of subjecting the partial polycondensation product of alkoxysilane to hydrolysis to form a sol, a salt is caused to exist in a concentration not less than $1\times10^{-4}$ mol based on 100 g of the partial polycondensation product of alkoxysilane.

If the salt is in a concentration less than $1\times10^{-4}$ mol based on 100 g of the partial polycondensation product of alkoxysilane, the gel may come to have a high bulk density to cause a large number of cracks during the step of drying.

With an increase in salt concentration, the gelation of the sol may take place in a shorter time to cause a lowering of operability, and also, if the salt is present in a large quantity, it may become deposited as a large mass in the gel in the step of drying, thus causing bubble defects in the silica glass obtained. For such reasons, with regard to the upper limit of the salt concentration, the salt in the sol may preferably be in a concentration not more than $100\times10^{-4}$ mol, and more preferably from $2\times10^{-4}$ mol to $20\times10^{-4}$ mol, based on 100 g of the partial polycondensation product of alkoxysilane.

In the present invention, the salt refers to those from which silicates originating from the raw material alkoxysilane are excluded. There are no particular limitations on the type of the salt. Good results can be obtained in a low salt concentration when the anion constituting the salt is a nitrate ion, a nitrite ion or a chloride ion. The salt is used so as not to remain in the silica glass. It is evaporated during the step of firing, or removed by washing or the like in a suitable step, e.g., before the firing.

In the step of hydrolyzing the partial polycondensation product of alkoxysilane, as methods by which the salt of not less than $1\times10^{-4}$ mol based on 100 g of the partial polycondensation product of alkoxysilane is caused to exist, i.e., as methods by which concentration of the salt in hydrolysate gel is adjusted to be not less than $1\times10^{-4}$ mol based on 100 g of the partial polycondensation product of alkoxysilane, various methods are available, as described below.

(1) In the partial polycondensation product of alkoxysilane, a part of the acid used as a catalyst as previously mentioned remains in its final product. As a raw material, a partial polycondensation product of alkoxysilane which contains an acid component in a concentration not less than $1\times10^{-4}$ mol based on 100 g of the partial polycondensation product of alkoxysilane may be used, whereby the acid component remaining in the partial polycondensation product of alkoxysilane reacts with the basic catalyst, so that the salt can be formed in the sol in a concentration not less than $1\times10^{-4}$ mol based on 100 g of the partial polycondensation product of alkoxysilane.

This acid component remaining in the partial polycondensation product of alkoxysilane is measured by titration using a suitable base, e.g., a methanol solution of choline, and it does not matter whether the form of its presence is in the state of a free acid or in the state of a compound with silicon, and may be any of those capable of producing a salt as a result of its reaction with the basic catalyst added in the step of preparing the sol.

With an increase in acid concentration, the gelation of the sol may take place in a shorter time to cause a lowering of operability, and also, when partial polycondensation products of alkoxysilane which have a high concentration of residual acid are stored for a long period of time, atmospheric moisture and water content may become mixed to cause a lowering of stability with time and also the product may turn into a gel. For such reasons, with regard to the upper limit of the concentration of the acid component in the partial polycondensation product of alkoxysilane, the acid component may preferably be in a concentration not more than $20 \times 10^{-4}$ mol based on 100 g of the partial polycondensation product of alkoxysilane. The residual acid component may particularly preferably be in a concentration of from $2 \times 10^{-4}$ mol to $10 \times 10^{-4}$ mol.

The salt concentration can be adjusted by controlling the concentration of the residual acid component in the partial polycondensation product of alkoxysilane in this way, so as to be above the required value. With an increase in the concentration of the residual acid component, however, the stability with time of the partial polycondensation product of alkoxysilane may become undesirably poor in some cases. Accordingly, it becomes necessary to take a method in which a partial polycondensation product of alkoxysilane which has a low concentration of residual acid component is used so that the salt concentration in the sol may be increased to the range within which the cracking does not occur during the step of drying. Such a method includes methods (2) to (4) shown below.

(2) The adjustment to make the salt concentration in the hydrolysate sol not less than $1 \times 10^{-4}$ mol based on 100 g of the partial polycondensation product of alkoxysilane can be made by adding a salt, in particular, a nitrate or a hydrochloride.

As the salt, it is preferable to use a salt obtained by allowing at least one of bases such as ammonium hydroxide, tetramethylammonium hydroxide, tetraethylammonium hydroxide, tetrapropylammonium hydroxide, tetrabutylammonium hydroxide and choline to react with at least one of acids such as nitric acid and hydrochloric acid.

There are no particular limitations on the amount of the salt added. Since, in order to prevent the gel from cracking during the step of drying, the salt must be present in the sol in a concentration not less than $1 \times 10^{-4}$ mol based on 100 g of the partial polycondensation product of alkoxysilane, the sum total of i) the salt formed by the neutralization reaction of the residual acid component in the partial polycondensation product of alkoxysilane with the basic catalyst and ii) the salt added may be determined so as to be not less than this concentration.

Also when the partial polycondensation product of alkoxysilane containing the acid component in a concentration not less than $1 \times 10^{-4}$ mol based on 100 g of the partial polycondensation product of alkoxysilane is used as a raw material, the addition of the salt may be employed in combination so as to make the salt concentration optimum.

With an increase in salt concentration, the time taken for making the sol into the gel becomes shorter to cause a lowering of operability, or the salt may abruptly scatter to cause cracking during the step of forming the gel into fired glass, and also bubble defects in the resulting glass may be caused. Hence, the salt in the sol may preferably be controlled to be in a concentration not more than $100 \times 10^{-4}$ mol in total, based on 100 g of the partial polycondensation product of alkoxysilane. It may more preferably be in a concentration of from $2 \times 10^{-4}$ to $20 \times 10^{-4}$ mol based on 100 g of the partial polycondensation product of alkoxysilane.

As these methods for adding the salt, the salt may be added to a mixture solution of alkoxysilane, the solvent, organic polymeric compound and basic catalyst, or may be added in water dropwise added to the mixture solution of these. Either method may be employed.

(3) The adjustment to make the salt concentration in the hydrolysate sol not less than $1 \times 10^{-4}$ mol based on 100 g of the partial polycondensation product of alkoxysilane can be made by adding an acid to form a salt by neutralization reaction with the basic catalyst.

The acid may preferably be at least one of nitric acid or hydrochloric acid.

There are no particular limitations on the amount of acid added. Since, in order to prevent the gel from cracking during the step of drying, the salt must be present in the sol in a concentration not less than $1 \times 10^{-4}$ mol based on 100 g of the partial polycondensation product of alkoxysilane, the amount of acid, such as nitric acid or hydrochloric acid, to be added may be determined so that the sum total of i) the salt formed by the neutralization reaction of the residual acid component in the partial polycondensation product of alkoxysilane with the basic catalyst and ii) the salt formed by the neutralization reaction of the acid added, with the basic catalyst, may be not less than this concentration.

Also when the partial polycondensation product of alkoxysilane containing the acid component in a concentration not less than $1 \times 10^{-4}$ mol based on 100 g of the partial polycondensation product of alkoxysilane is used as a raw material, the addition of the acid may be employed in combination to form the salt by the neutralization reaction with the basic catalyst, so as to optimize the salt concentration.

With an increase in salt concentration, the time taken for making the sol into the gel becomes shorter, causing a lowering of operability, or the salt may abruptly scatter during the step of forming the gel into fired glass, causing cracking, and also bubble defects in the resulting glass may be caused. Hence, the salt in the sol may preferably be controlled to be in a concentration not more than $100 \times 10^{-4}$ mol in total, based on 100 g of the partial polycondensation product of alkoxysilane. It may more preferably be in a concentration of from $2 \times 10^{-4}$ to $20 \times 10^{-4}$ mol.

There are no particular limitations on methods for adding the acid. The acid may be added to a mixture solution of the partial polycondensation product of alkoxysilane, solvent, organic polymeric compound and basic catalyst, or may be added in water dropwise added to the mixture solution of these. Either method may be employed.

(4) The adjustment to make the salt concentration in the hydrolysate sol not less than $1 \times 10^{-4}$ mol based on 100 g of the partial polycondensation product of alkoxysilane can be made by adding a component capable of releasing an acid upon decomposition under basic conditions to form a salt by neutralization reaction of the released acid with the basic catalyst.

The component capable of releasing an acid upon decomposition under basic conditions when the sol is prepared may include at least one of nitrates of silicon, nitrites of silicon and chlorides of silicon.

There are no particular limitations on the component capable of releasing an acid upon decomposition under basic conditions. Any component may give a good result, if the components is capable of releasing an acid, such as a nitric acid or nitrous acid, upon hydrolysis under basic conditions to form a salt by neutralization reaction of the released acid with the basic catalyst. As this component, for example, at least one of trimethylsilane nitrate, trimethylsilane nitrite, triethylsilane nitrate, and triethylsilane nitrite can be used.

There are no particular limitations on the amount of the component capable of releasing an acid upon decomposition under basic conditions. Since in order to prevent the gel from cracking in the step of drying the salt must be present in the sol in a concentration not less than $1 \times 10^{-4}$ mol based on 100 g of the partial polycondensation product of alkoxysilane, the amount of the component to be added that is capable of releasing an acid upon decomposition under basic conditions may be determined so that the sum total of i) the salt formed by the neutralization reaction of the residual acid component in the partial polycondensation product of alkoxysilane with the basic catalyst and ii) the salt formed by the neutralization reaction of the acid released from the component capable of releasing an acid upon decomposition under basic conditions, with the basic catalyst may be not less than this concentration.

Also when the partial polycondensation product of alkoxysilane containing the acid component in a concentration not less than $1 \times 10^{-4}$ mol based on 100 g of the partial polycondensation product of alkoxysilane is used as a raw material, the addition of the component capable of releasing an acid upon decomposition under basic conditions may be employed in combination so as to optimize the salt concentration.

With an increase in salt concentration, the time taken for making the sol into the gel becomes shorter, thus causing a lowering of operability, or the salt may abruptly scatter to cause cracking in the step of forming the gel into fired glass, and also bubble defects in the resulting glass may be caused. Hence, the salt in the sol may preferably be controlled to be in a concentration not more than $100 \times 10^{-4}$ mol in total based on 100 g of the partial polycondensation product of alkixysilane. It may more preferably be in a concentration of from $2 \times 10^{-4}$ to $20 \times 10^{-4}$ mol.

As methods for adding this component capable of releasing an acid upon decomposition under basic conditions, it may be added to a mixture solution of the alkoxysilane, solvent, organic polymeric compound and basic catalyst, or may be added in water dropwise added to the mixture solution of these. Either method may be employed.

The methods (1) to (4) described above may be employed in appropriate combination.

The alkoxyl group of the partial polycondensation product of alkoxysilane may preferably be a methoxy group from the viewpoint of the readiness in hydrolysis carried out using the basic catalyst and from the viewpoint of the cost. Accordingly, polymethoxysilane is preferred as the partial polycondensation product of alkoxysilane.

As the solvent, at least one of alcohols such as methanol, ethanol, n-propanol and iso-propanol may be used, and also solvents having high boiling point and low surface tension such as N,N-dimethylacetamide, N,N-dimethylformamide, methoxyethanol, ethoxyethanol and tetrahydrofurfuryl alcohol may be added thereto.

As the organic polymeric compound, at least one of polyvinyl acetate, polyethylene glycol and derivatives thereof, hydroxypropyl cellulose, and so forth may be used. Polyvinyl acetate is particularly preferred.

As the basic catalyst, at least one of ammonium hydroxide, tetramethylammonium hydroxide, tetraethylammonium hydroxide, tetrapropylammonium hydroxide, tetrabutylammonium hydroxide, and choline may be used. Choline is particularly preferred.

There are no particular limitations on the amount of the basic catalyst to be added. It may preferably be in an amount of 1 to $7 \times 10^{-4}$ mol based on 100 g of the partial polycondensation product of alkoxysilane, as the concentration of a part of the basic catalyst added, i.e., the part (an effective basic catalyst) not consumed in the formation of salt by the reaction with the acid component within the partial polycondensation product of silicon alkoxide, the added acid, and the acid released from an added component that is capable of releasing an acid upon decomposition under basic conditions.

As described above, the partial polycondensation product of alkoxysilane is subjected to hydrolysis catalyzed by a base in the presence of the organic polymeric compound to form a sol; the sol is made into a gel, and the gel is dried to form a dry gel. The dry gel may be fired using a known method, for example, in an environment of air, and then, in an environment of helium, and at a temperature raised to 1,200° to 1,400° C., to form the silica glass.

The detailed reason as to why, in the present invention, the gel can be well prevented from cracking in the step of drying when the salt is caused to exist in a concentration of not less than $1 \times 10^{-4}$ mol based on 100 g of the partial polycondensation product of alkoxysilane, in the step of hydrolyzing the partial polycondensation product of alkoxysilane to form the sol, is unclear, and is presumed as follows.

In the sol where the organic polymeric compound is present together, silica particles formed as a result of hydrolysis and polycondensation of alkoxysilane and the organic polymeric compound cause interaction such as hydrogen bonding, so that the gel presumably comes to have a low bulk density which leads to the prevention of cracking in the step of drying. This interaction is presumed to be affected by the surface potential of the silica particles and organic polymeric compound. A trace amount of the salt in the sol during the step of preparing the sol causes a decrease in the surface potential of the silica particles and organic polymeric compound, so that the interaction between the silica particles and the organic polymeric compound becomes stronger and also the interaction between silica-organic polymeric compound composites becomes stronger, whereby the lowering of the bulk density of the gel is accelerated, hence the gel can be prevented from cracking in the step of drying, as so presumed.

Thus, in the present invention, in the process for producing silica glass, comprising the steps of subjecting a partial polycondensation product of alkoxysilane to hydrolysis in the presence of a solvent, an organic polymeric compound and a basic catalyst to form a sol, gelling the sol into a gel, drying the gel to form a dry gel, and firing the dry gel to form the glass, the gel can be prevented from cracking in the step of drying when the salt is caused to exist in a concentration not less than $1 \times 10^{-4}$ mol based on 100 g of the partial polycondensation product of alkoxysilane in the step of hydrolyzing the partial polycondensation product of alkoxysilane to form the sol.

BEST MODES FOR WORKING THE INVENTION

Examples 1 to 3, Comparative Examples 1 and 2

Tetramethoxysilane was subjected to partial hydrolysis and polycondensation by water using methanol as a solvent and nitric acid as a catalyst, followed by removal of the solvent. These steps were repeated under different conditions to prepare polymethoxysiloxanes having the following concentrations of residual acid components, respectively, as measured by titration made using a methanol solution of choline:

$1\times10^{-6}$ mol (Comparative Example 1)

$5\times10^{-5}$ mol (Comparative Example 2)

$1\times10^{-4}$ mol (Example 1)

$2\times10^{-4}$ mol (Example 2)

$6\times10^{-4}$ mol (Example 3)

based on 100 g of the partial polycondensation product of tetramethoxysilane (polymethoxysiloxane). To 2,000 g of each polymethoxysiloxane, 1,800 g of methanol and 50 g (as solid matter) of polyvinyl acetate (average degree of polymerization: 1,500) were added, followed by mixing. To the mixture solutions thus obtained, a choline methanol solution (1M) was added so as to exceed the concentration of the residual acid in polymethoxysiloxane by $3\times10^{-4}$ mol per 100 g of polymethoxysiloxane. Next, the temperature of the mixture solutions was kept at 15° C., and 800 g of water was dropwise added thereto. After the addition was completed, mixing was further continued for 1 hour to obtain sols. In the sols thus obtained, the salt concentration is $1\times10^{-6}$ mol (Comparative Example 1), $5\times10^{-5}$ mol (Comparative Example 2), $1\times10^{-4}$ mol (Example 1), $2\times10^{-4}$ mol (Example 2) and $6\times10^{-4}$ mol (Example 3) respectively per 100 g of polymethoxysiloxane, and the concentration of the base (choline) not consumed in the neutralization reaction with the residual acid (i.e., effective base concentration) is $3\times10^{-4}$ mol per 100 g of polymethoxysiloxane. The sols obtained were poured into Teflon-coated stainless steel containers of 260 mm square in an amount of 1,000 g each, and their openings were hermetically closed with polyvinyl chloride film, and further hermetically closed with aluminum foil. The containers holding the sols were heated to 40° C. to gel the sols. Thereafter, the container was left to be at room temperature the aluminum foil was removed, and the temperature was raised to 30° C., subsequently to 60° C., and then to 120° C. to remove the solvent in the gels to form dry gels. The dry gels thus prepared using the above polymethoxysiloxane materials were examined for cracking to obtain the results as shown in Table 1. As is clearly seen from Table 1, dry gels free of cracks can be prepared in a high yield when the salt in the sol is in a concentration not less than $1\times10^{-4}$ mol based on 100 g of polymethoxysiloxane.

TABLE 1

|  | Residual acid concentration in polymethoxy-siloxane | Salt concentration in sol | Effective base concentration | Dry gel yield (crack-free/total no.) |
|---|---|---|---|---|
| Comparative Example: |  |  |  |  |
| 1 | $1 \times 10^{-6}$ | $1 \times 10^{-6}$ | $3 \times 10^{-4}$ | 0 (0/4) |
| 2 | $5 \times 10^{-5}$ | $5 \times 10^{-5}$ | $3 \times 10^{-4}$ | 0 (0/4) |
| Example: |  |  |  |  |
| 1 | $1 \times 10^{-4}$ | $1 \times 10^{-4}$ | $3 \times 10^{-4}$ | 0.75 (3/4) |
| 2 | $2 \times 10^{-4}$ | $2 \times 10^{-4}$ | $3 \times 10^{-4}$ | 1 (4/4) |
| 3 | $6 \times 10^{-4}$ | $6 \times 10^{-4}$ | $3 \times 10^{-4}$ | 1 (4/4) |

Concentration unit: mol/100 g polymethoxysiloxane

Examples 4 to 9, Comparative Examples 3 and 4

To 2,000 g of polymethoxysiloxane having a residual acid concentration of $0.01\times10^{-4}$ mol per 100 g of polymethoxysiloxane as measured by titration made using a methanol solution of choline, 1,800 g of methanol and 50 g (as solid matter) of polyvinyl acetate (average degree of polymerization: 1,500) were added, followed by mixing. To the mixture solution thus obtained, a choline methanol solution (1M) was added so as to exceed the concentration of the residual acid in polymethoxysiloxane by $3\times10^{-4}$ mol per 100 g of polymethoxysiloxane (as effective base concentration), followed by further addition of choline chloride in each of the following concentrations:

$0.49\times10^{-4}$ mol (Comparative Example 3)

$0.99\times10^{-4}$ mol (Example 4)

$1.99\times10^{-4}$ mol (Example 5)

$3.99\times10^{-4}$ mol (Example 6)

based on 100 g of polymethoxysiloxane, or choline nitrate in each of the following concentrations:

$0.49\times10^{-4}$ mol (Comparative Example 4)

$0.99\times10^{-4}$ mol (Example 7)

$1.99\times10^{-4}$ mol (Example 8)

$3.99\times10^{-4}$ mol (Example 9)

based on 100 g of polymethoxysiloxane, and further followed by thorough mixing. Next, while keeping the temperature of the solutions thus obtained at 15° C., 800 g of water was dropwise added thereto. After the addition was completed, mixing was further continued for 1 hour to obtain sols. The sols thus obtained were poured into containers, made into gels and then dried to form dry gels in the same manner as in Example 1. The dry gels thus prepared under the above conditions were examined for cracking to obtain the results as shown in Table 2. As is clearly seen from Table 2, dry gels free of cracks can be prepared in a high yield when the salt in the sol prepared using choline chloride or choline nitrate is in a concentration not less than $1\times10^{-4}$ mol based on 100 g of polymethoxysiloxane.

TABLE 2

|  | Additive | Salt concentration in sol | Effective base concentration | Dry gel yield (crack-free/total no.) |
|---|---|---|---|---|
| Comparative Example: |  |  |  |  |
| 3 | Choline chloride | $5 \times 10^{-5}$ | $3 \times 10^{-4}$ | 0 (0/4) |
| Example: |  |  |  |  |
| 4 | Choline chloride | $1 \times 10^{-4}$ | $3 \times 10^{-4}$ | 1 (4/4) |
| 5 | Choline chloride | $2 \times 10^{-4}$ | $3 \times 10^{-4}$ | 1 (4/4) |
| 6 | Choline chloride | $4 \times 10^{-4}$ | $3 \times 10^{-4}$ | 1 (4/4) |
| Comparative Example: |  |  |  |  |
| 4 | Choline nitrate | $5 \times 10^{-5}$ | $3 \times 10^{-4}$ | 0 (0/4) |
| Example: |  |  |  |  |
| 7 | Choline nitrate | $1 \times 10^{-4}$ | $3 \times 10^{-4}$ | 0.75 (3/4) |
| 8 | Choline nitrate | $2 \times 10^{-4}$ | $3 \times 10^{-4}$ | 1 (4/4) |
| 9 | Choline nitrate | $4 \times 10^{-4}$ | $3 \times 10^{-4}$ | 1 (4/4) |

Concentration unit: mol/100 g polymethoxysiloxane

Examples 10 to 15, Comparative Examples 5 to 8

To 2,000 g of polymethoxysiloxane having a residual acid concentration of $0.01\times10^{-4}$ mol per 100 g of polymethoxysiloxane as measured by titration made using a methanol solution of choline, 1,800 g of methanol and 50 g (as solid matter) of polyvinyl acetate (average degree of polymerization: 1,500) were added, followed by mixing. To the mixture solution thus obtained, a 1N aqueous nitric acid solution was added in each of the following concentrations:

$0.09 \times 10^{-4}$ mol (Comparative Example 5)
$0.49 \times 10^{-4}$ mol (Comparative Example 6)
$0.99 \times 10^{-4}$ mol (Example 10)
$1.99 \times 10^{-4}$ mol (Example 11)
$3.99 \times 10^{-4}$ mol (Example 12)

based on 100 g of polymethoxysiloxane, or 1N hydrochloric acid in each of the following concentrations:

$0.09 \times 10^{-4}$ mol (Comparative Example 7)
$0.49 \times 10^{-4}$ mol (Comparative Example 8)
$0.99 \times 10^{-4}$ mol (Example 13)
$1.99 \times 10^{-4}$ mol (Example 14)
$3.99 \times 10^{-4}$ mol (Example 15)

based on 100 g of polymethoxysiloxane, followed by further addition of a choline methanol solution (1M) so as to exceed the total of the residual acid in polymethoxysiloxane and the acid added by $3 \times 10^{-4}$ mol per 100 g of polymethoxysiloxane (as effective base concentration), and further followed by mixing.

The temperature of the mixture solutions thus obtained was kept at 15° C., and 800 g of water was dropwise added thereto while stirring. After the addition was completed, mixing was further continued for 1 hour to obtain sols. Subsequently, the sols thus obtained were poured into containers, made into gels and then dried to form dry gels in the same manner as in Example 1. The dry gels thus prepared under the above conditions were examined for cracking to obtain the results as shown in Table 3. As is clearly seen from Table 3, dry gels free of cracks can be prepared in a high yield when the salt in the sol prepared using nitric acid or hydrochloric acid is in a concentration not less than $1 \times 10^{-4}$ mol based on 100 g of polymethoxysiloxane.

TABLE 3

| | Additive | Salt concentration in sol | Effective base concentration | Dry gel yield (crack-free/total no.) |
|---|---|---|---|---|
| Comparative Example: | | | | |
| 5 | Nitric acid | $1 \times 10^{-5}$ | $3 \times 10^{-4}$ | 0 (0/4) |
| 6 | Nitric acid | $5 \times 10^{-5}$ | $3 \times 10^{-4}$ | 0 (4/4) |
| Example: | | | | |
| 10 | Nitric acid | $1 \times 10^{-4}$ | $3 \times 10^{-4}$ | 1 (4/4) |
| 11 | Nitric acid | $2 \times 10^{-4}$ | $3 \times 10^{-4}$ | 1 (4/4) |
| 12 | Nitric acid | $4 \times 10^{-4}$ | $3 \times 10^{-4}$ | 1 (4/4) |
| Comparative Example: | | | | |
| 7 | Hydrochloric acid | $1 \times 10^{-5}$ | $3 \times 10^{-4}$ | 0 (0/4) |
| 8 | Hydrochloric acid | $5 \times 10^{-5}$ | $3 \times 10^{-4}$ | 0 (0/4) |
| Example: | | | | |
| 13 | Hydrochloric acid | $1 \times 10^{-4}$ | $3 \times 10^{-4}$ | 0.75 (3/4) |
| 14 | Hydrochloric acid | $2 \times 10^{-4}$ | $3 \times 10^{-4}$ | 1 (4/4) |
| 15 | Hydrochloric acid | $4 \times 10^{-4}$ | $3 \times 10^{-4}$ | 1 (4/4) |

Concentration unit: mol/100 g polymethoxysiloxane

Examples 16 to 25, Comparative Examples 9 to 12

Silver nitrate or silver nitrite and trimethylsilane chloride or triethylsilane chloride, all in equimolar amounts, were reacted at room temperature in a methylene chloride solution, and silver chloride precipitated was removed using a filter. Thus, solutions of trimethylsilane nitrate, trimethylsilane nitrite, triethylsilane nitrate and triethylsilane nitrite each were prepared.

To 2,000 g of polymethoxysiloxane having a residual acid concentration of $0.01 \times 10^{-4}$ mol per 100 g of polymethoxysiloxane as measured by titration made using a methanol solution of choline, 1,800 g of methanol and 50 g (as solid matter) of polyvinyl acetate (average degree of polymerization 1,500) were added, followed by mixing. To the mixture solution thus obtained, trimethylsilane nitrate was added, in each of the following concentrations:

$0.09 \times 10^{-4}$ mol (Comparative Example 9)
$0.49 \times 10^{-4}$ mol (Comparative Example 10)
$0.99 \times 10^{-4}$ mol (Example 16)
$1.99 \times 10^{-4}$ mol (Example 17)
$3.99 \times 10^{-4}$ mol (Example 18)

based on 100 g of polymethoxysiloxane, trimethylsilane nitrite in each of the following concentrations:

$0.09 \times 10^{-4}$ mol (Comparative Example 11)
$0.49 \times 10^{-4}$ mol (Comparative Example 12)
$0.99 \times 10^{-4}$ mol (Example 19)
$1.99 \times 10^{-4}$ mol (Example 20)
$3.99 \times 10^{-4}$ mol (Example 21)

based on 100 g of polymethoxysiloxane, triethylsilane nitrate in each of the following concentrations:

$1.99 \times 10^{-4}$ mol (Example 22)
$3.99 \times 10^{-4}$ mol (Example 23)

based on 100 g of polymethoxysiloxane, or triethylsilane nitrite each in the following concentration:

$1.99 \times 10^{-4}$ mol (Example 24)
$3.99 \times 10^{-4}$ mol (Example 25)

based on 100 g of polymethoxysiloxane, followed by further addition of a choline methanol solution (1M) was added so as to exceed the total of the residual acid in polymethoxysiloxane and the nitrate or nitrite of silicon added by $3 \times 10^{-4}$ mol per 100 g of polymethoxysiloxane (as effective base concentration), and further followed by mixing.

The temperature of the mixture solutions thus obtained was kept at 15° C., and 800 g of water was dropwise added thereto while stirring. After the addition was completed, mixing was further continued for 1 hour to obtain sols. Subsequently, the sols thus obtained were poured into containers, made into gels and then dried to form dry gels in the same manner as in Example 1. The dry gels thus prepared under the above conditions were examined for cracking to obtain the results as shown in Tables 4 and 5. As is clearly seen from Tables 4 and 5, dry gels free of cracks can be prepared in a high yield when the salt in the sol adjusted with addition of the nitrate or nitrite of silicon is in a concentration not less than $1 \times 10^{-4}$ mol based on 100 g of polymethoxysiloxane.

TABLE 4

| Additive | Salt concentration in sol | Effective base concentration | Dry gel yield (crack-free/total no.) |
|---|---|---|---|
| Comparative Example: | | | |
| 9  Trimethylsilane nitrate | $1 \times 10^{-5}$ | $3 \times 10^{-4}$ | 0 (0/4) |
| 10 Trimethylsilane nitrate | $5 \times 10^{-5}$ | $3 \times 10^{-4}$ | 0 (4/4) |
| Example: | | | |
| 16 Trimethylsilane nitrate | $1 \times 10^{-4}$ | $3 \times 10^{-4}$ | 1 (4/4) |
| 17 Trimethylsilane nitrate | $2 \times 10^{-4}$ | $3 \times 10^{-4}$ | 1 (4/4) |
| 18 Trimethylsilane nitrate | $4 \times 10^{-4}$ | $3 \times 10^{-4}$ | 1 (4/4) |
| Comparative Example: | | | |
| 11 Trimethylsilane nitrite | $1 \times 10^{-5}$ | $3 \times 10^{-4}$ | 0 (0/4) |
| 12 Trimethylsilane nitrite | $5 \times 10^{-5}$ | $3 \times 10^{-4}$ | 0 (0/4) |

Concentration unit: mol/100 g polymethoxysiloxane

TABLE 5

| Additive | Salt concentration in sol | Effective base concentration | Dry gel yield (crack-free/total no.) |
|---|---|---|---|
| Example: | | | |
| 19 Trimethylsilane nitrite | $1 \times 10^{-4}$ | $3 \times 10^{-4}$ | 0.75 (3/4) |
| 20 Trimethylsilane nitrite | $2 \times 10^{-4}$ | $3 \times 10^{-4}$ | 1 (4/4) |
| 21 Trimethylsilane nitrite | $4 \times 10^{-4}$ | $3 \times 10^{-4}$ | 1 (4/4) |
| 22 Triethylsilane nitrate | $2 \times 10^{-4}$ | $3 \times 10^{-4}$ | 1 (4/4) |
| 23 Triethylsilane nitrate | $4 \times 10^{-4}$ | $3 \times 10^{-4}$ | 1 (4/4) |
| 24 Triethylsilane nitrite | $2 \times 10^{-4}$ | $3 \times 10^{-4}$ | 1 (4/4) |
| 25 Triethylsilane nitrite | $4 \times 10^{-4}$ | $3 \times 10^{-4}$ | 1 (4/4) |

Concentration unit: mol/100 g polymethoxysiloxane

According to the present invention, silica glass free of cracks can be stably prepared by the sol-gel method, and the reduction of the cost of silica glass, that is an advantage of the sol-gel method, can be effectively achieved. Hence, a variety of quartz glass substrates used for producing semiconductor devices or liquid-crystal devices can be furnished at a low cost.

In addition, there are basically no limitations on the size and shape of the glass that can be produced, and not only plate materials but also any rods and pipes can be produced, which can also be applied to jigs for fabricating semiconductor devices.

We claim:

1. A process for producing silica glass, comprising;

a solling step of subjecting a partial polycondensation product of alkoxysilane to hydrolysis in the presence of a solvent, an organic polymeric compound and a basic catalyst to form a sol; a gelling step of gelling said sol;

a drying step of drying the gel to form a dry gel; and a firing step of firing the dry gel to form the glass;

wherein, in said sol formed in said solling step, a salt is present in a concentration not less than $1 \times 10^{-4}$ mol based on 100 g of said partial polycondensation product of alkoxysilane.

2. The process for producing silica glass according to claim 1, wherein said salt is removed before the firing step is completed.

3. The process for producing silica glass according to claim 1, wherein said salt is present in a concentration of from $2 \times 10^{-4}$ mol to $20 \times 10^{-4}$ mol based on 100 g of the partial polycondensation product of alkoxysilane.

4. The process for producing silica glass according to claim 2, which further comprises a washing step of washing the dry gel before the firing step;

said salt being removed in the washing step.

5. The process for producing silica glass according to claim 2, wherein said salt is a material that volatilizes when said material is heated.

6. The process for producing silica glass according to claim 5, wherein said salt is removed by volatilization of salt in the firing step.

7. The process for producing silica glass according to claim 1 or 2, wherein said salt is a salt of ammonia or choline.

* * * * *